United States Patent [19]

Culbertson, Jr.

[11] Patent Number: 5,697,108
[45] Date of Patent: Dec. 16, 1997

[54] SUITLOCK DOCKING MECHANISM

[75] Inventor: Philip Culbertson, Jr., Redwood City, Calif.

[73] Assignee: The United States of America as represented by the Administrator of the National Aeronautics and Space Administration, Washington, D.C.

[21] Appl. No.: 730,917

[22] Filed: Sep. 30, 1996

[51] Int. Cl.⁶ ............................................. A41D 13/00
[52] U.S. Cl. ........................... 2/457; 2/2.11; 244/161
[58] Field of Search ........................ 2/457, 2.11, 2.14, 2/2.15, 2.12, 2.13, 456, 69, 69.5, 79, 84, 901; 244/158 R, 159, 161; 114/335; 405/189, 192, 193

[56] References Cited

U.S. PATENT DOCUMENTS

| | | | |
|---|---|---|---|
| 2,813,022 | 11/1957 | Moulthrop | 2/457 |
| 2,985,129 | 5/1961 | Kirkpatrick | 2/457 |
| 3,405,406 | 10/1968 | Vykukal | 2/2.1 A |
| 3,534,407 | 10/1970 | Barthlome | 2/2.12 |
| 3,537,668 | 11/1970 | Kosmo et al. | 114/335 |
| 3,583,322 | 6/1971 | Vykukal | 104/1 |
| 3,636,564 | 1/1972 | Vykukal | 2/2.1 A |
| 3,744,055 | 7/1973 | Brendgord | 2/457 |
| 3,777,750 | 12/1973 | Savornin | 2/437 |
| 4,091,464 | 5/1978 | Vykukal | 2/2.1 A |
| 4,151,612 | 5/1979 | Vykukal | 2/2.1 A |
| 4,302,848 | 12/1981 | Otsuka et al. | 2/457 |
| 4,593,415 | 6/1986 | Vykukal | 2/2.1 A |
| 4,594,734 | 6/1986 | Vykukal | 2/2.1 A |
| 4,598,428 | 7/1986 | VyKukal | 2/2.1 A |
| 4,669,413 | 6/1987 | Cummins | 114/335 |
| 4,842,224 | 6/1989 | Cohen | 244/159 |
| 4,898,348 | 2/1990 | Kahn | 244/161 |
| 5,005,786 | 4/1991 | Okamoto et al. | 244/161 |

*Primary Examiner*—Amy B. Vanatta
*Attorney, Agent, or Firm*—Kenneth L. Warsh; John G. Mannix; Gary Borda

[57] ABSTRACT

An environmental protective suit used for hazardous cleanup or space applications includes a suitlock docking mechanism that allows for easy egress and ingress of a crew member between a sealed vessel and a possibly contaminated environment. The suitlock docking mechanism comprises a single actuator that controls latches which, in turn, respectfully control rack and pinion assemblies that allow for easy removal and attachment of a life support equipment enclosure shell to the environmental protective suit or to the vehicle from which the operator performs his/her duties.

13 Claims, 13 Drawing Sheets

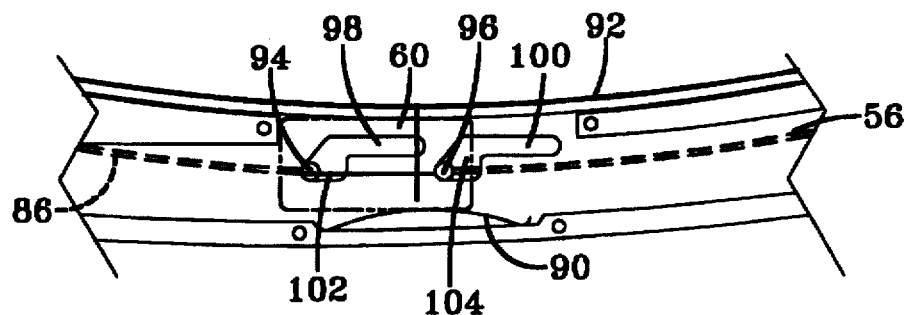
FIG-6A
RELEASE POSITION
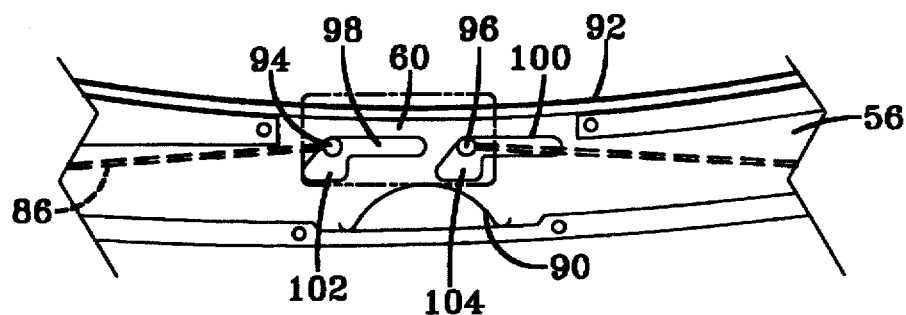
FIG-6B
SPRING-LOADED POSITION
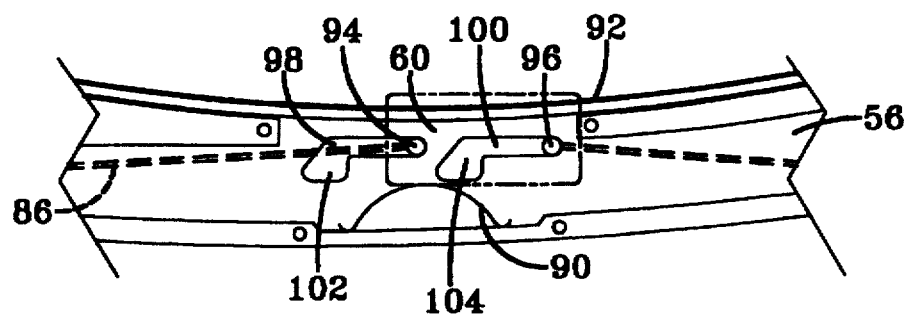
FIG-6C
LOCKED POSITION
FIG-6

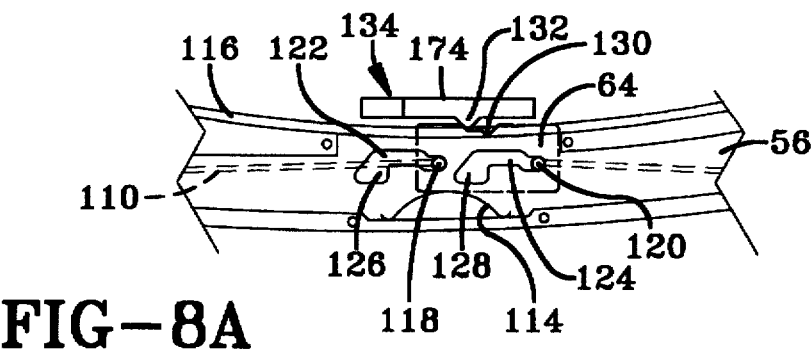
FIG-8A
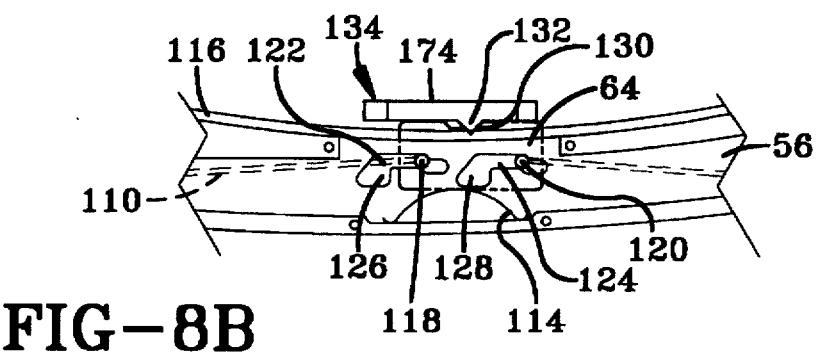
FIG-8B
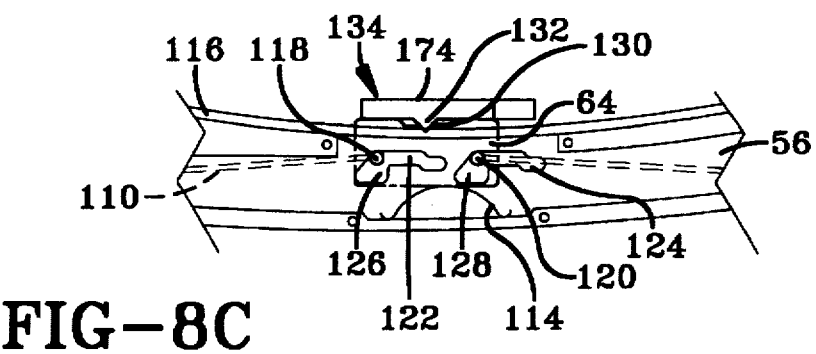
FIG-8C
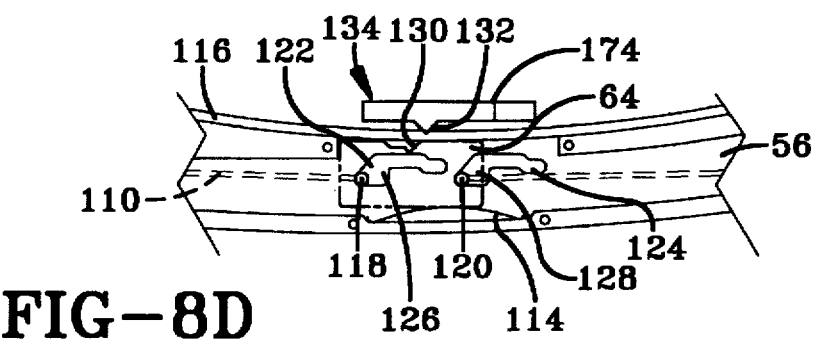
FIG-8D
FIG-8

SUITLOCK DOCKING MECHANISM

The invention described herein was made in the performance of work under a NASA contract and is subject to Public Law 96-517 (35 U.S.C. 200 et seq.). The contractor has not elected to retain title to the invention.

BACKGROUND OF THE INVENTION

A. Technical Field of the Invention

The present invention relates to an apparatus for entering and leaving a sealed vessel in an environmental suit, such as a suit for handling hazardous material, or a suit used to perform tasks on a space station or a space vehicle. More particularly, the present invention relates to an environmental suit having a suitlock docking mechanism that allows for egress and ingress to a sealed vessel. Specifically, the present invention relates to a suitlock docking mechanism having a single actuator whose operation completely controls the docking and un-docking of the environmental suit to a sealed vessel so as to more easily allow for the egress and ingress from and to the sealed vessel.

B. Description of the Prior Art

Systems that allow for egress and ingress from a sealed vessel are known and one such system is described in U.S. Pat. No. 4,842,224 ('224) of M. M. Cohen and is herein incorporated by reference. The '224 patent discloses a suitport system, more particularly, a lock mechanism that allows a crew member to easily connect/disconnect his/her space suit, carrying life supporting equipment, to the hatch of a vehicle, such as a space station or space vehicle, so that the crew member is allowed easy ingress and egress to and from the environmental suit. The '224 patent further discloses an environmental suit particularly suited for use when it is desired to enter or leave a sealed vessel, such as a space station or a space vehicle. The environmental suit of the '224 patent incorporates components from space suits described in the following U.S. Pat. Nos. issued to Vykukal: 3,405,406; 3,636,564; 4,091,464; 4,151,612; 4,593,415; 4,594,734; 4,598,428; and 3,583,322, all of which are herein incorporated by reference. Although the space suit of all of these references serve well their intended purpose, it is desired that further improvements be made to the docking mechanism. Further, it is desired that an environmental suit, along with its associated docking mechanism, be provided that has the ability to dock to a sealed vehicle that is used during the clean-up of hazardous and/or toxic materials.

Although an environmental suit for space applications and those used during hazardous material clean-up have similar requirements and needs, the actual environment in which a space suit is used is different than the environment in which a hazardous material suit is used. More particularly, the environment in which a space suit is used approaches that of a vacuum and is not contaminated, whereas the environment in which a hazardous suit is used is usually contaminated and does not approach that of a vacuum. Accordingly, the sealing requirements for a space suit is different than a suit used for hazardous material, but it is still desired to provide one docking mechanism that serves both applications.

The crew member no matter what environment needs to be provided with easy access to and from the space suit or hazardous material suit that protects him/her from the environment in which she/he works. Although the suitport of the '224 patent serves well the needs of space applications, it does not provide sealing of potentially contaminated volume opened into a vehicle and it would not serve the needs of hazardous material clean-up situations. Further, the suitport of the '224 patent is considered to be far too heavy to be carried on the back of an operator performing hazardous material clean-up tasks.

The '224 patent discloses a suitport lock mechanism that includes the use of two handles to dock and/or un-dock the environmental suit to the vehicle. Although the suitport lock mechanism of the '224 patent may work in a zero-gravity, space environment, it is desired further improvements thereto be provided, such as the reduction of a number of controls needed to dock and/or un-dock the environmental suit to the sealed vehicle so as to simplify the docking and/or un-docking procedures and also to substantially prevent chances of contamination by inadvertent usage of any of the control mechanisms. Moreover, the further improvements to the suitport lock mechanism should include proper sealing for hazardous material clean-up situations, be light weight to ease the burden of the operator performing hazardous material clean-up tasks, and provide fail-safe operation so that a failure does not cause damage or serious malfunction.

An environmental suit used for hazardous clean-up or to perform tasks on a planetary surface should be as light in weight as possible, and also should provide as much visibility as possible, so as to enhance the crew member's ability to perform his/her duties.

Accordingly, it is a primary object of the present invention to provide for an environmental suit used for hazardous material clean-up and/or space applications and having a suitlock docking mechanism which is light weight, failsafe, and incorporates an easily operated control mechanism.

It is another object of the present invention to provide for an environmental suit that is properly sealed so as to be used for hazardous material clean-up applications.

It is another object of the present invention to provide for an environmental suit that allows for relatively high visibility for the crew member situated therein.

SUMMARY OF THE INVENTION

The present invention is directed to a suitlock docking mechanism incorporated into an environmental or protective suit and that allows easy egress and ingress from and to the protective suit.

The suitlock system comprises a protective suit, a ring affixed to the back of the protective suit, an enclosure for a portable life support system (PLSS), a containment assembly, a vehicle ring affixed to a hatch, a first and a second means for releasably connecting and disconnecting the PLSS enclosure assembly of the protective suit and the containment assembly. The protective suit has a back with an access opening to allow for the donning and doffing of the protective suit by a crew member. The first means is for releasably attaching the ring of the protective suit to the vehicle ring of the hatch. The second means comprises a single actuator having linkage adjustment means for releasably and separately connecting and disconnecting the portable life support system (PLSS) enclosure assembly and the containment assembly to the ring of the protective suit and for releasably and jointly connecting and disconnecting the portable life support system assembly and the containment assembly to the vehicle ring affixed to the hatch.

The attainment of the foregoing and related objects, advantages and features of the invention should be more readily apparent to those skilled in the art, after review of the following detailed description of the invention, taken together with the drawings, in which:

BRIEF DESCRIPTION OF THE DRAWINGS

FIG. 6 is composed of FIGS. 6(A), 6(B), and 6(C) each illustrating respective positions associated with the spring-loaded latch members connected to the exterior portion of the hatch ring of FIG. 5.

FIG. 8 is composed of FIGS. 8(A), 8(B), 8(C), and 8(D) each illustrating respective positions associated with the spring-loaded latch members and rack and pinion assemblies interconnected to the interior surface of the hatch ring of FIG. 7.

DETAILED DESCRIPTION OF THE INVENTION

Figure 1:
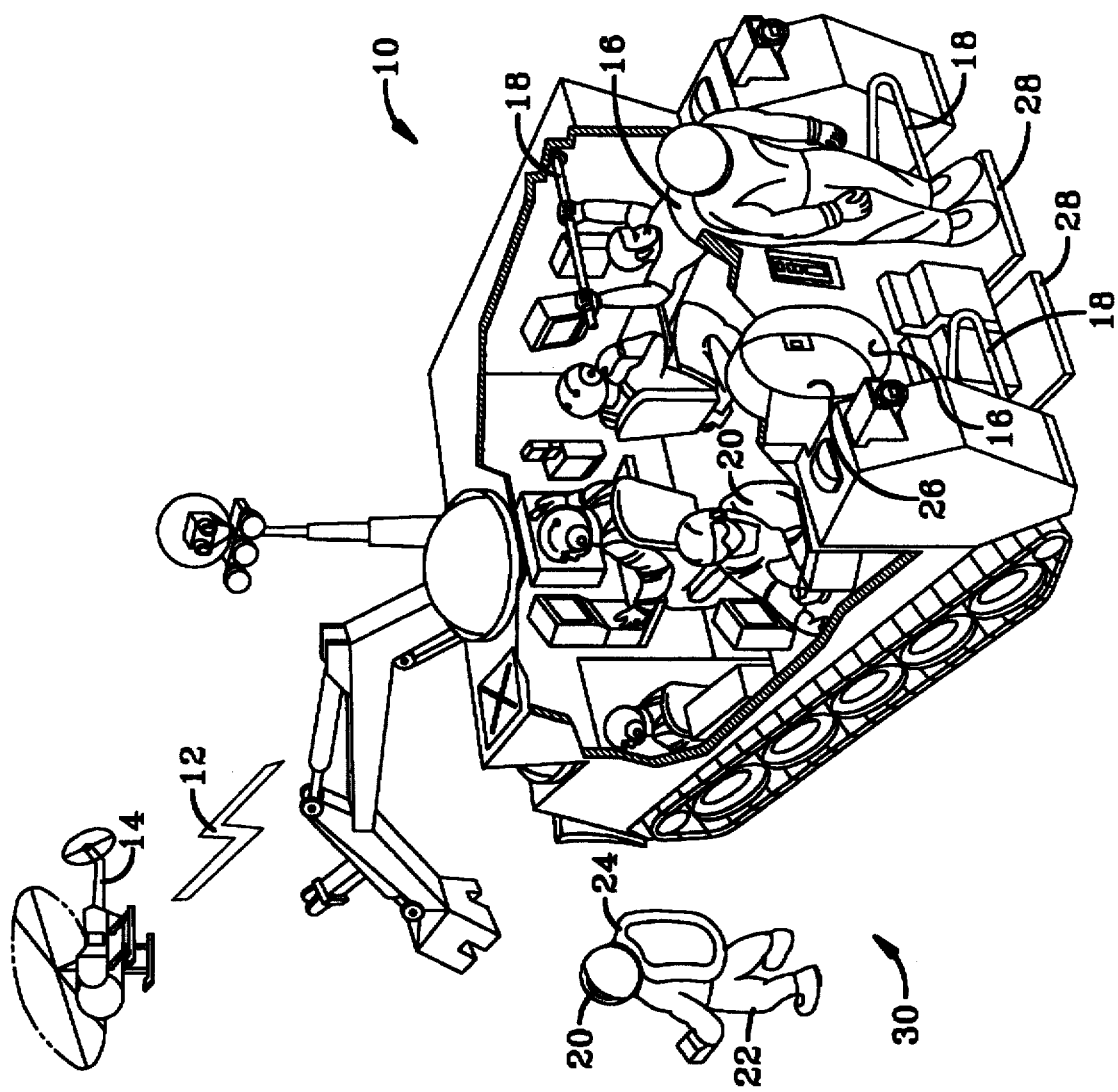
FIG. 1 is a perspective view of a team of crew members some of which are wearing protective suits and all of which are utilizing a vehicle particularly suited for hazardous material clean-up situations.
Figure 2:
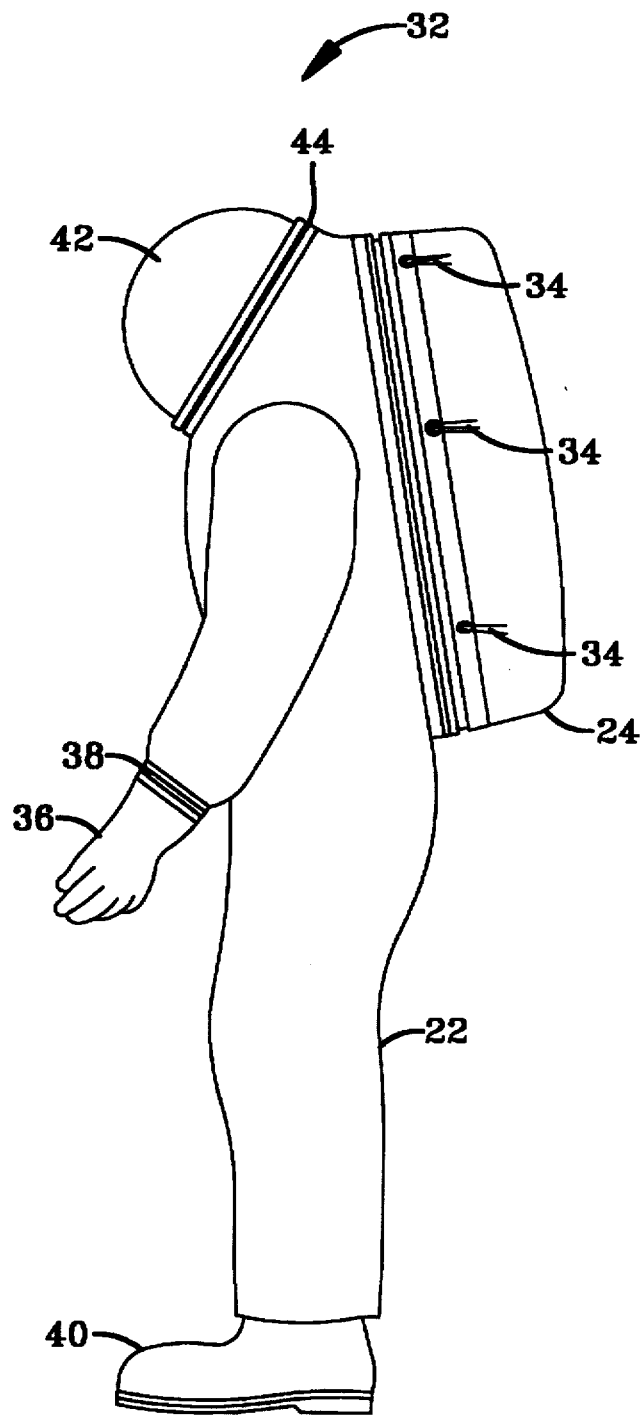
FIG. 2 illustrates a suitlock assembly as it is worn by a crew member.

With reference to the drawings, wherein the same reference numbers indicate the same elements throughout, there is shown in FIG. 1 a perspective view of a sealed hazmat vehicle 10 that may be used in a situation that requires the clean-up of hazardous or toxic materials. The sealed hazmat vehicle 10 contains various equipment to provide a communications link 12 between an unmanned, robotic helicopter 14 to precisely locate the hazardous material under consideration. The sealed hazmat vehicle 10 has two openings in its rear access panel which are sealed by a containment assembly 26, to be further described with reference to FIG. 4, when a protective suit, to be further described with reference to FIG. 2, is away from the hazmat vehicle 10. Hand and bar rails 18 assist anyone of the crew members 20 for egressing and ingressing the hazmat vehicle 10.

In general, the suitlock docking mechanism of the present invention allows a crew member 20 positioned inside a sealed hazmat vehicle 10 to enter an environmental or protective suit, preferably having two layers serving as pressure and environmental barriers, through the hatch 16 which actually is the containment assembly 26 and, then to disconnect the protective suit from the vehicle portion of the suitlock docking mechanism affixed to the rear access panel and go to work. When reentering the hazmat vehicle 10, the crew member 20 backs or maneuvers the protective suit into the suitlock docking mechanism and the protective suit is captured against the hazmat vehicle 10 by means of spring-loaded latches. A crew member 20, inside the hazmat vehicle 10, opens the docking mechanism and the suited crew member 20 climbs out of the protective suit without exposing himself/herself, or the vehicle interior, to the contamination on the outside of the hazmat vehicle 10. As generally illustrated in FIG. 1, the crew member 20 wears a protective suit 22 to which is attached a portable life support enclosure assembly 24 which may also be referred to herein as a portable life support enclosure 24, or a PLSS assembly 24. The PLSS assembly 24 nests within the containment assembly 26 when the protective suit 22 is docked to the sealed hazmat vehicle 10. A self-contained, portable life support system not shown, is attached to a modified backpack frame and carried by the crew member 20 inside the protective suit 22. The equipment worn by the crew member 20 either standing on a platform 28 of the hazmat vehicle 10 or on the ground 30 may be further described with reference to FIG. 2.

FIG. 2 illustrates the protective suit 22, the PLSS (portable life support system) assembly 24 which encloses the portable life support system not shown, as comprising an assembly herein referred to as the suitlock assembly 32, that is part of a suitlock docking mechanism to be further described hereinafter with reference to FIGS. 4–12. The entire suitlock assembly 32 advantageously weighs approximately 60 pounds when the cryogenic portable life support system is fully charged.

Protective suits are typically constructed of fabrics coated with various types of chemical resistance material, known in the art, and serve as environment suits used during the performance of clean-up of hazardous or toxic materials and commonly referred to as hazmat suits. The portable life support system is typically a standard self-contained breathing apparatus (SCBA) which typically supplies approximately one hour of breathing air. In a typical incident, the crew members cleaning-up the hazardous material must first walk up to a quarter of a mile from a safe staging area to get to the contaminated site in order to analyze and attempt to neutralize the hazardous situation. The crew members must then walk back to the "safe zone" and commence decontamination procedures which can take up to 15 minutes. The total time required to transverse to and from the contaminated area, plus the time required to perform decontamination procedures, leaves typically, without the benefits of the present invention, actual "on site" hazardous clean-up activity of frequently less than 20 minutes. To further aggravate the already difficult situation, typically sealed hazmat suits are very hot, and heat stress is a normal condition for the suited crew member and heat stroke is a constant threat. The present invention addresses these problems in a number of ways. More particularly, with the protective suit 22 attached to the environmentally sealed hazmat vehicle 10, the "safe zone" can be moved essentially into the "hot zone," thereby dramatically reducing traverse time. The use of a cryogenic life support system (2 hour capacity of liquid air supplying both breathing air and cooling), dramatically increases on-site time, while reducing risk of heat related problems. Further, by using the suitlock docking system of the present invention, the crew member 20 can return to the vehicle, doff the protective suit 22, rest, eat, recharge the life support system, and even re-enter the suit to continue operations, all without going through decontamination procedures.

The PLSS enclosure 24 has a plurality of grooves 34 spaced apart from each other about its circumference which have the grooved face of a ring shaft, to be described hereinafter with reference to FIG. 9, at their distal end. The crew member 20 carrying the suitlock assembly 32 wears gloves 36 with bands 38, shoes 40 and a helmet 42 joined to a circular helmet ring 44 which may be further described with reference to FIG. 3.

Figure 3:
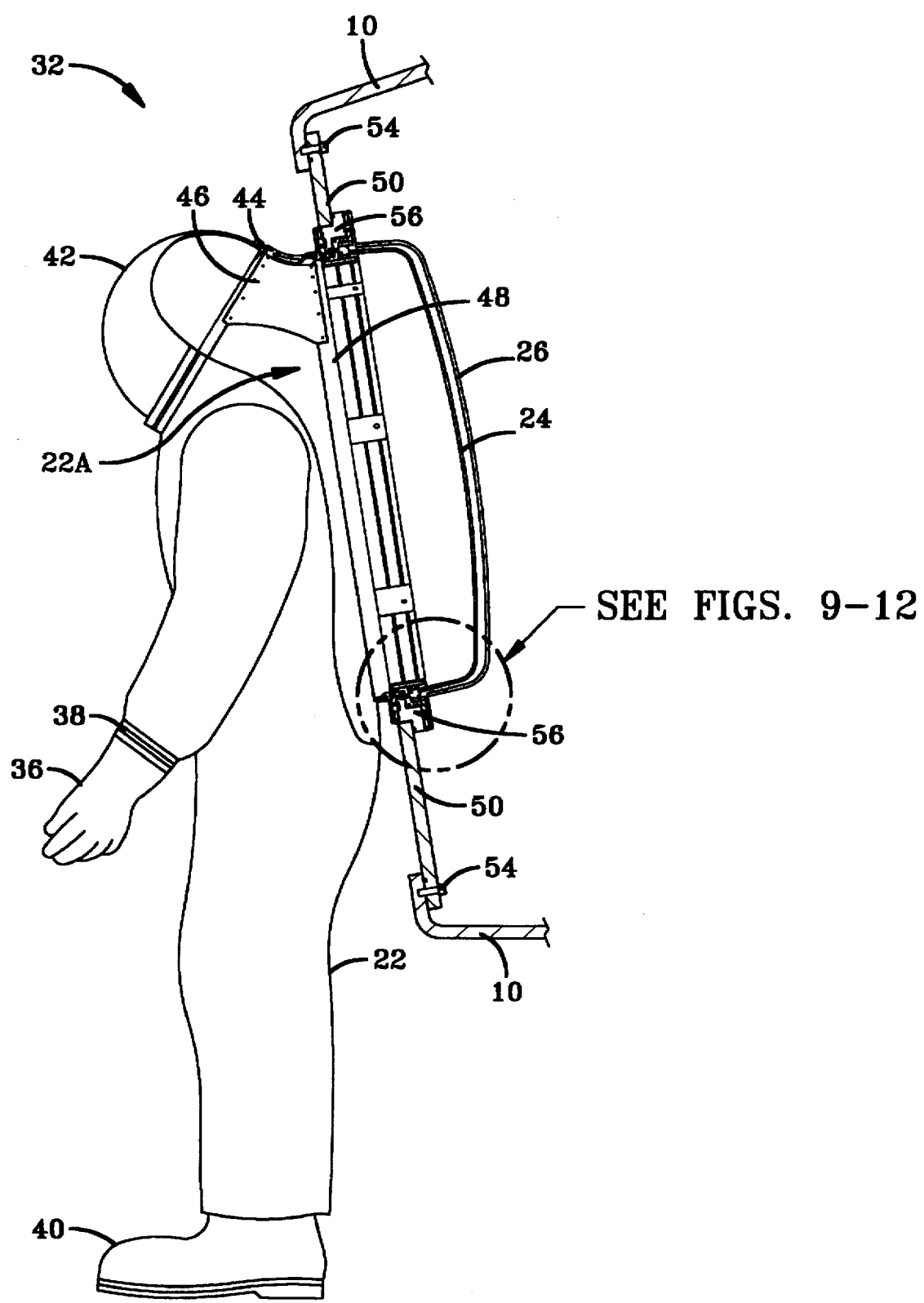
FIG. 3 illustrates the suitlock assembly of FIG. 2 partially cut-away so as to illustrate further details thereof.

FIG. 3 is partially cut-away to illustrate the circular helmet ring 44 as being rigidly attached to a fiberglass fixture 46 by suitable fastening means such as rivets which, in turn, is rigidly attached by suitable fastening means such as rivets to a suit ring 48 that is also formed of rigid material such as aluminum, and attached to the back of the protective suit 22 as generally illustrated in FIG. 3. The protective suit 22 is attachable to both the circular helmet ring 44 and a suit ring 48 (to be described) by removable band clamps. FIG. 3 further illustrates that the back region of the protective suit 22 preferably comprised of layers of fabric as having an opening defined by the suit ring 48 that allows for the crew member to egress and ingress therefrom and thereto. FIG. 3 further illustrates an access panel 50 with an opening, generally shown by the reference number 52. The access panel 50 is connected to the hazmat vehicle 12 by fastener means 54, whereas the opening 52 accepts a ring 56 which may be interchangeably referred to herein as a "hatch ring 56," or "vehicle ring 56" and which is interconnected to the containment assembly 26 in a manner as to be further described with reference to FIGS. 5–12. The suitlock assembly 32 may be further described with reference to FIG. 4.

Figure 4:
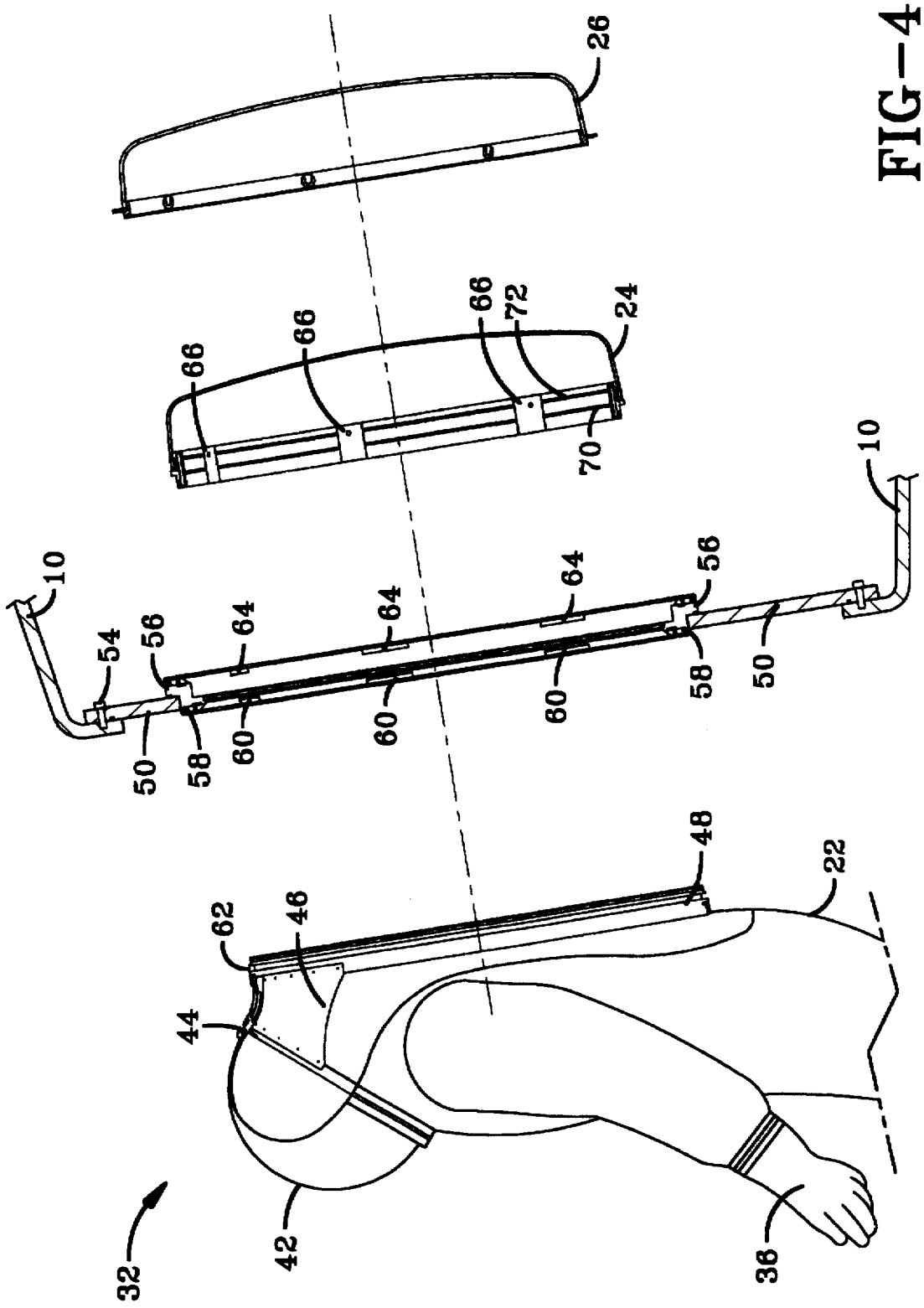
FIG. 4 is an exploded perspective view of the suitlock assembly of FIG. 2.

FIG. 4 illustrates the vehicle ring 56 as being connected to the access panel 50 by way of the fastener 58. The vehicle ring 56 further comprises a first releasable connecting/disconnecting means 60 that faces the suit ring 48 which has a groove or cutout 62 therein. The vehicle ring 56 further comprises a second releasable connecting/disconnecting means 64 that faces a containment assembly 26 as viewed in FIG. 4.

In general, the first means 60 provides for releasably attaching the suit ring 48 to the vehicle ring 56 and the second means comprises a single actuator having linkage adjustment means for releasably and separately connecting and disconnecting the PLSS assembly 24 and the containment assembly 26 to the suit ring 48 and releasably and jointly connecting and disconnecting the PLSS assembly 24 and the containment assembly 26 to the vehicle ring 56.

FIG. 4 further illustrates the PLSS assembly 24 as having a first rack and pinion assembly 66. As shown in FIG. 4, a plurality of rack and pinion assemblies are separated from each other by ribs 70 and 72. The first releasable connecting/disconnecting means 60 which is located on the exterior surface of the vehicle ring 56 that is facing the suit ring 48 may be further described with reference to FIG. 5, and is interchangeable referred to herein as a first latch member 60 or as a first, spring-loaded latch member 60.

Figure 5:
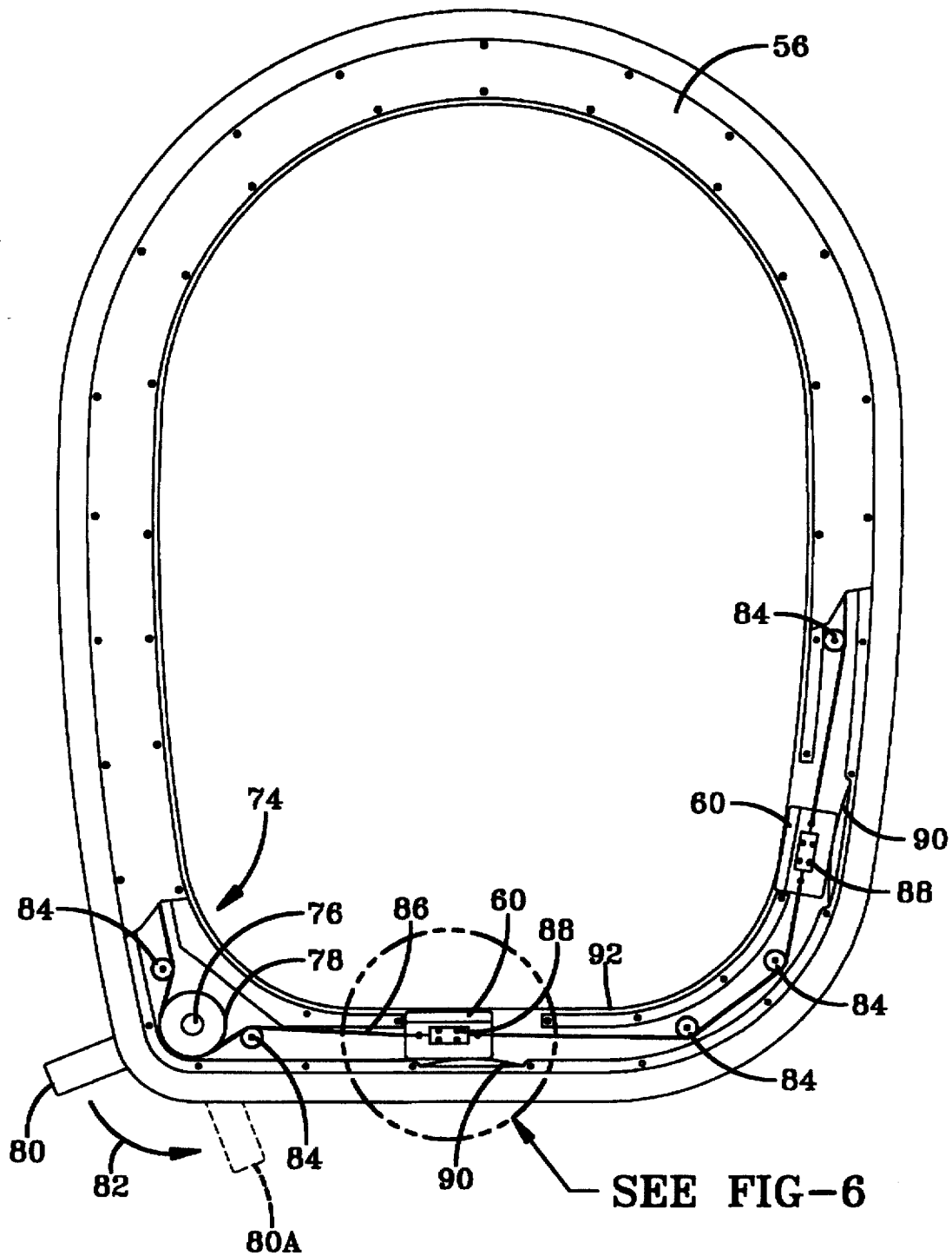
FIG. 5 illustrates an exterior view of the hatch ring of the suitlock docking mechanism of the present invention.

FIG. 5 is shown as being partially cut-away so as to illustrate that the first means 60 is interconnected to a cable assembly 74 comprising an O-ring sealed shaft 76 carrying two spindles, the first of which is shown as spindle 78 on the exterior face of the vehicle ring 56. The cable assembly 74 further comprises means (not shown), known in the art, for connecting the shaft 76 to a single actuator 80 that is rotatable in a predetermined direction, such as a counter clockwise direction, as indicated by directional arrow 82. The first or home position of rotation is indicated by a solid representation of actuator 80 and a second position of rotation is indicated by the phantom representation 80A of the single actuator 80. The single actuator 80 incorporates a spring-loaded pin (not shown for the sake of clarity but known in the art) that allows for discrete rotations of the actuator 80 for a terminal segment of the predetermined distance of rotation indicated by directional arrow 82.

The cable assembly 74 further comprises a plurality of cable guides 84 located about the circumference of the exterior face of the vehicle ring 56 and a first continuous cable 86 which is intertwined about the spindle 78 and the cable guides 84 and has connecting means 88 for connecting to the ends of first and second studs (to be described) of the first latch member 60.

It is preferred that seven (7) first latch members 60 be equally spaced apart from each other about the circumference of the exterior surface of the vehicle ring 56 and each be joined to a respective yielding means 90 preferably comprised of a leaf spring and which is arranged so as to be depressed radially as the first latch member 60 comes into contact with the tapered member of the suit ring 48 in a manner to be more fully described hereinafter with reference to FIGS. 9–12. The first latch member 60 is positioned near an elastomeric static seal 92. Elastomeric static seal 92 as well as the other seals of the present invention to be described used for sealing all the surfaces of the suitlock docking mechanism of the present invention operate so as to isolate the interior of the protective suit 22 as well as the interior of the hazmat vehicle 12 from contaminants, and is preferably of the type described in U.S. Pat. No. 4,593,415, already herein incorporated by reference. The first latch member 60 may be further described with reference to FIG. 6.

FIG. 6 is composed of FIGS. 6(A), 6(B), and 6(C) that respectively illustrate the release, spring-loaded, and locked positions of the first latch member 60 in a manner as to be more fully described hereinafter with reference to FIGS. 9–12.

Each of FIGS. 6(A), 6(B), and 6(C) illustrates that the first latch member 60 comprises first and second studs 94 and 96 having first and second ends, with the first end of each respectively fitting into grooves 98 and 100 which, in turn, respectively have depressions 102 and 104. Each of the first and second studs 94 and 96 is connected, via connecting means 88 (see FIG. 5), to the continuous cable 86. Each of the grooves 98 and 100 is formed in exterior surface of the vehicle ring 56. The first latch member 60 operatively cooperates a second latch member 64, sometimes referred to herein as a second, spring-loaded latch member 64, and which is located on the interior surface of the vehicle ring 56 which may be further described with reference to FIG. 7.

Figure 7:
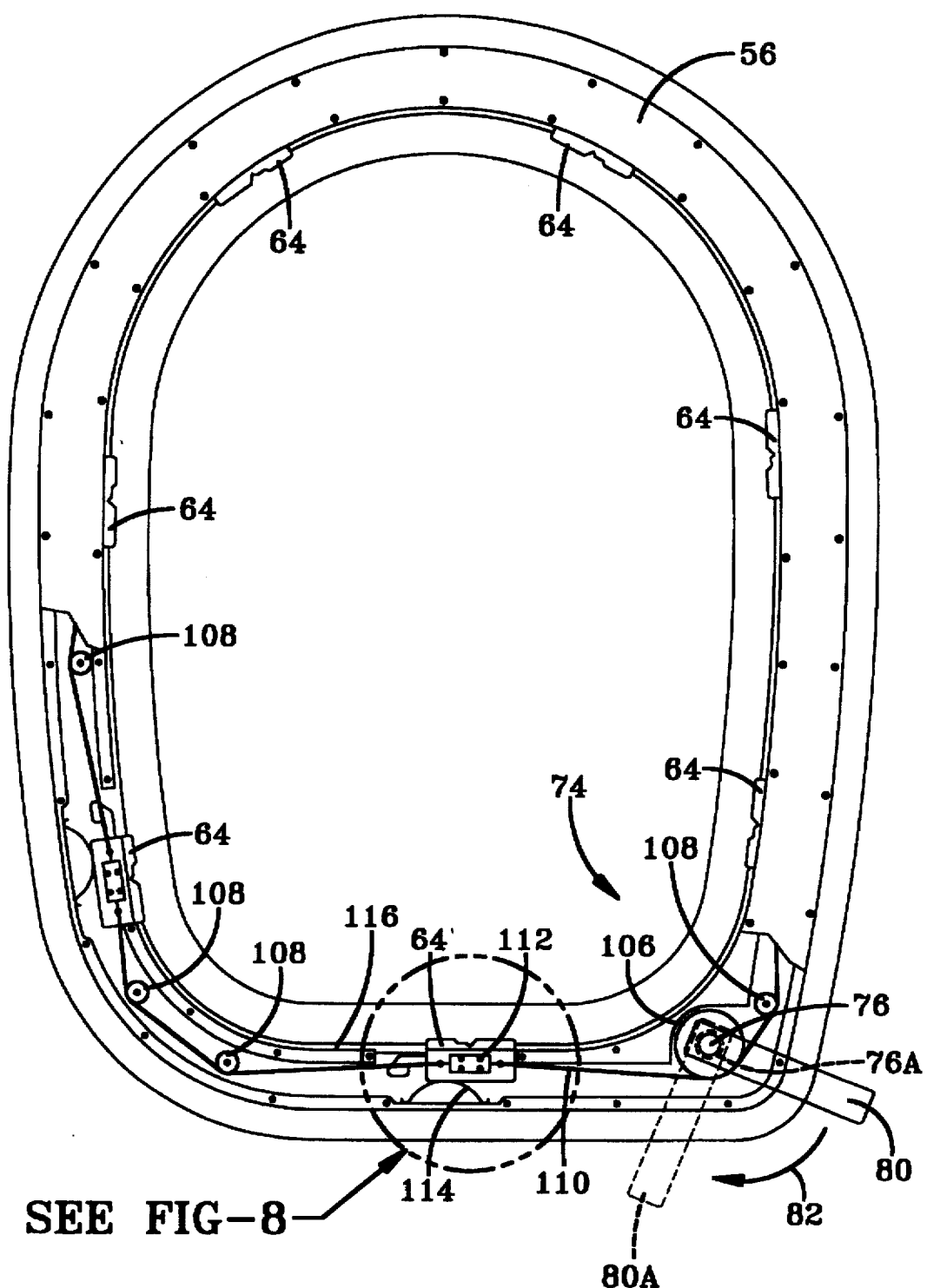
FIG. 7 illustrates an interior view of the vehicle ring of the suitlock docking mechanism of the present invention.

FIG. 7 illustrates that there are preferably seven (7) second latch members 64 which are in alignment with the first latch members 60 as well as with rack and pinion assemblies to be further described, all of which serve as releasably connecting/disconnecting means located around the inside perimeter of both the interior and exterior surfaces of the vehicle ring 56. In a manner as discussed for the first latch member 60, the second latch member 64 is also interconnected to and controlled by the cable assembly 74. The cable assembly 74, in addition to the components previously described with reference to FIG. 5, further comprises a second spindle 106 coupled to the shaft 76 which, in turn, is coupled to the single actuator 80, within which is contained the spring-loaded pin previously discussed with reference to FIG. 5 and now generally shown in phantom by the nomenclature 76A. The cable assembly 74 still further comprises a plurality of cable guides 108 located about a circumference of the interior face of the vehicle ring 56. The cable assembly 74 still further comprises a second continuous cable 110 intertwined about the spindle 106 and the cable guides 108 and having means 112 for being connected to the first and second studs of the latch member 64 which rides on a yielding means 114 that preferably comprises a leaf spring. The second latch member 64 is positioned near an elastomeric seal 116, also shown in FIGS. 9–12 to be described hereinafter. The elastomeric seal 116 is preferably of the type already described for seal 92. The second latch member 64 may be further described with reference to FIG. 8.

FIG. 8 is composed of FIGS. 8(A), 8(B), 8(C), and 8(D) that respectively illustrate the lock/disengaged, locked, spring-loaded, and released positions of the second latch means 64 in a manner as is to be more fully described hereinafter with reference to FIGS. 9–12.

Each of FIGS. 8(A), 8(B), 8(C), and 8(D) illustrates that the second latch member 64 has first and second studs 118 and 120 which have first and second ends each of which has one end that respectively fits into and is guided within grooves 122 and 124 which, in turn, have depressions 126 and 128 at one end thereof. The studs 118 and 120 also have their other end connected, via connecting means 112 (see FIG. 7), to the continuous cable 110. The grooves 122 and 124 are formed in the interior surface of the vehicle ring 56. The second latch member 64 has a groove 130 having a lowermost portion with preferably a V-shape that is selectively engaged by a tab 132, in turn attached to gear rack 174 of a rack and pinion assembly 134 which operatively cooperates with the first rack and pinion assembly 66 that may be further described with reference to FIG. 9.

Figure 9:
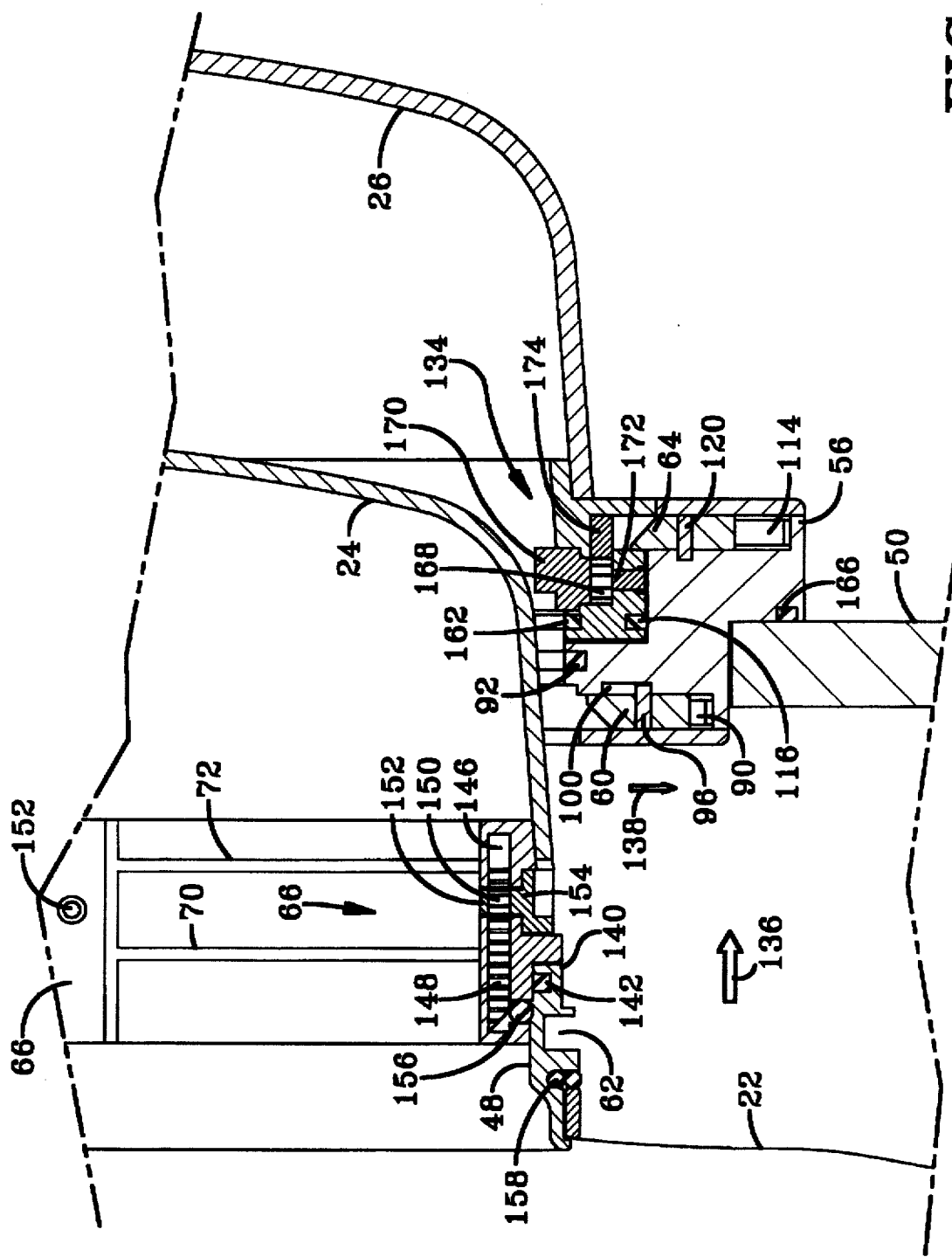
FIGS. 9, 10, 11 and 12 respectively illustrates the interrelationship involved with the docking, capture, transfer, and release operations of the suitlock docking mechanism of the present invention.

FIG. 9 illustrates that the suit ring 48, carrying with it the PLSS assembly 24, may be moved inward (as viewed in FIG. 9) toward the vehicle ring 56 in a direction as indicated by directional arrow 136. In a manner to be more fully described, as the PLSS assembly 24 is moved inward, its tapered outer surface comes into contact with the latch member 60, to be described, causing the first latch member 60 to move radially outward in a direction indicated by directional arrow 138 and radially depressing the leaf spring 90. The suit ring 48 has a tapered portion 140 which carries an elastomeric seal 142 which preferably is of the same type as seal 92. The tapered portion 140 is arranged so that it precedes the groove 62 of the suit ring 48 as the suit ring 48 is moved toward the vehicle ring 56.

As seen in FIG. 9, the first rack and pinion assembly 66 is positioned so as to be non-collinear with the first latch member 60. More particularly, it is preferred that the first rack and pinion assembly 66 be located so as to be perpendicular to the first latch member 60. Similarly, the second rack and pinion assemblies 134 is positioned non-collinear, more particularly and preferably, perpendicular to the second latch member 64.

The first rack and pinion assembly 66 has its rack 148 positioned, in an offset manner, within a chamber 146 at the edge portion of the PLSS assembly 24. The first rack and pinion assembly 66 further comprises a first ring shaft having gears 150 at its central region and first and second ends 152 and 154, and with the end 154 having a grooved face portion which, in turn, has a portion extending downward therefrom as viewed in FIG. 9. The rack 148 is positioned so as to be located near a ball 156 that rides or is projected into a groove of the suit ring 48. A bead 158, sewn into the fabric protective suit 22, fits into a groove around the circumference of the suit ring 48 and is clamped by a band clamp. FIG. 9 also illustrates seals 162, and 116 all similar to seal 92. FIG. 9 illustrates an O-ring seal 166 between the vehicle ring 56 and the access panel 50 (not shown). All of the seals shown in FIG. 9 seal the surfaces to which they mate or contact.

The second rack and pinion assembly 134 further comprises a containment ring shaft having a central gear portion 168 and first and second ends 170 and 172, with the end 170 shaped in a complementary manner relative to the grooved face portion 154 of first rack and pinion assembly 66 so as to substantially mate thereto and so as to be captured thereby in a manner as to be described. The geared portion 168 meshes with the gears of the gear rack 174 which is connected to a tab 132 engaging the V-shaped groove 130 of the second latch member 64 previously described with reference to FIG. 8.

OPERATION OF THE SUITLOCK DOCKING MECHANISM

The suitlock docking mechanism comprises the single actuator 80 that controls the first latch member 60, the second latch member 64, the first rack and pinion assembly 66, and the second rack and pinion assembly 134.

The operation of the suitlock docking mechanism may be described with reference to FIGS. 4–12. The operation is accomplished by preferably seven (7) latching stations cooperatively supplied by the interaction between the first latch member 60, the second latch member 64, the first rack and pinion assembly 66, and the second rack and pinion assembly 134, all aligned with each other and all equally spaced around the periphery as most clearly illustrated in FIG. 7, with respect to the second latch member 64. The operation of the suitlock docking mechanism may be described with reference to four modes which are docking, capture, transfer, and release.

DOCKING MODE

With simultaneous reference to FIGS. 3, 4, 6A, 6B and 9, it is seen that a crew member may maneuver a potentially contaminated protective suit 22 (see FIG. 4) backward into the opening 52 of the access panel 50, defined by the spacing between structure members of the access panel 50 (see FIG. 4). This opening is more particularly defined by the vehicle ring 56 (see FIG. 4). Even before the backward maneuvering, it is seen in FIG. 9 that the offset rack 148 positions the ball 156 downward so as to be projected into the groove in the surface of the suit ring 48, effectively attaching the two elements together. The backward maneuvering by the crew member is most clearly illustrated in FIG. 9 by means of directional arrow 136. A five (5) degree taper on the tapered member 140 of the suit ring 48, as well as on the edge regions of the PLSS assembly 24, helps to guide the suit ring 48 into the opening 52 defined by the vehicle ring 56. The spring loaded latches 60 positioned around the inside perimeter of the vehicle ring 56 are depressed radially as the suit ring 48 comes together with the vehicle ring 56. Further, as seen in FIG. 9, as the tapered edge of the PLSS assembly 24 comes into contact with the first latch member 60, the tapered edge of the PLSS assembly 24 forces the first latch member 60 downward in the direction indicated by directional arrow 138, until the leaf spring 90 (see FIG. 6A) is at its bottomed-out condition.

CAPTURE MODE

Figure 10:
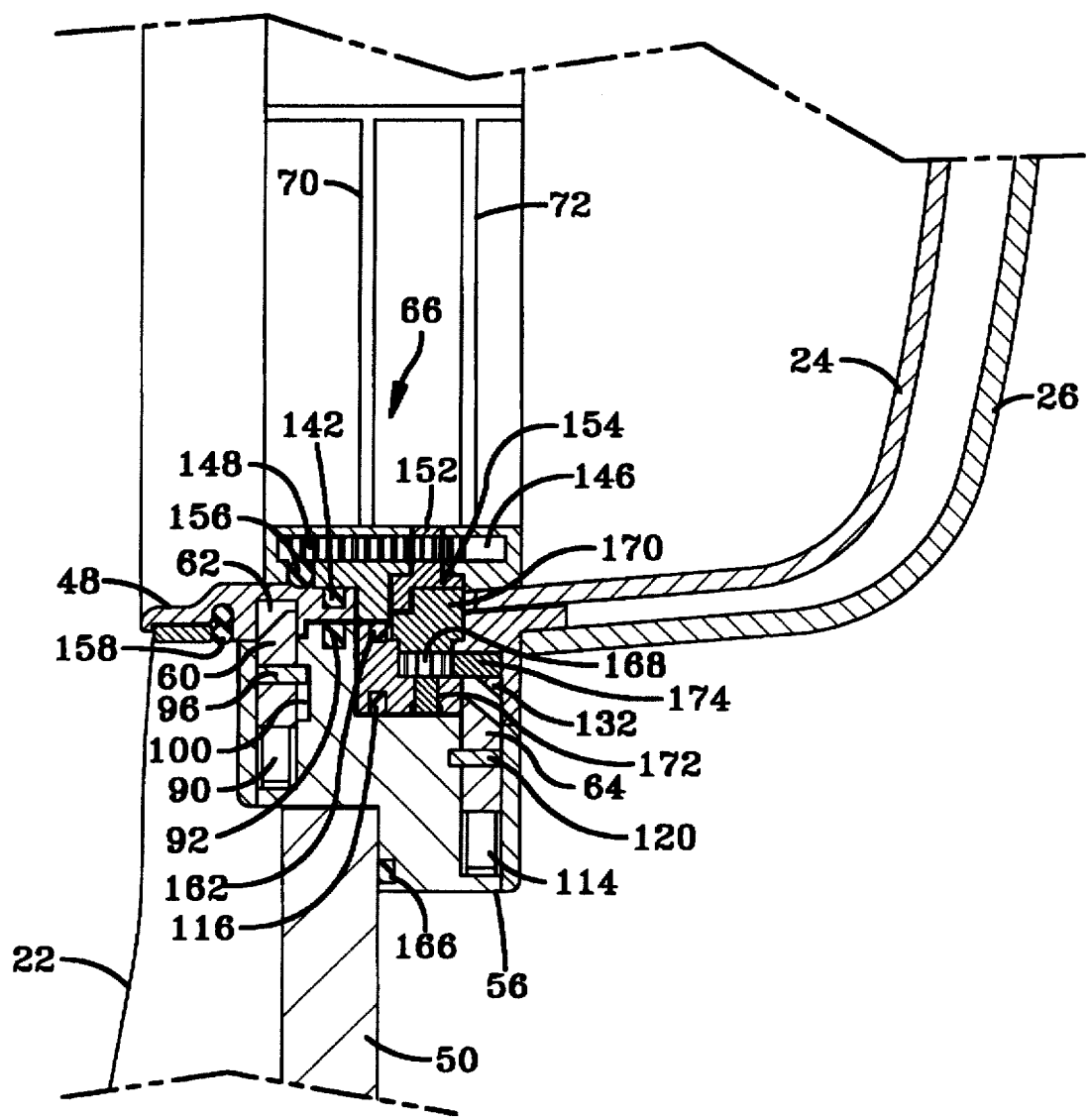

With simultaneous reference to FIGS. 4, 6(B), 8(B), 9 and 10, it is seen that as the suit ring 48 is moved inward in direction 136 (see FIG. 9) toward the vehicle ring 56, the tapered portion 140 of the suit ring 48 passes over the latch member 60 until it bottoms out and allows the cutout or groove 62 of the suit ring 48 to appear over the first latch member 60. This occurrence (cutout 62 meeting the first latch member 60) allows the leaf spring 90 to no longer be depressed (see FIG. 6(B)) and to seek its non-depressed state so that the first latch member 60 snaps into the opening 62 (see FIG. 10) causing the suit ring 48, carrying the PLSS assembly 24, to be captured by the vehicle ring 56. When the PLSS assembly 24 is attached to the suit ring 48, the grooved face portion 154 of the PLSS assembly 24 shaft is aligned with, and is free to slide over the projected portion 170 of the shaft of the containment assembly 26. More particularly, as seen in FIG. 10, the downwardly extending portion of the grooved face portion 154 fits into the cutout section of the projected portion 170. Further, as seen in FIG. 10, the teeth 168 are meshed with the teeth of gear rack 174 which, in turn, has its tab 132 inserted into the V-shaped groove 130 of the second latch member 64 (see FIG. 8(B)).

TRANSFER MODE

Figure 11:
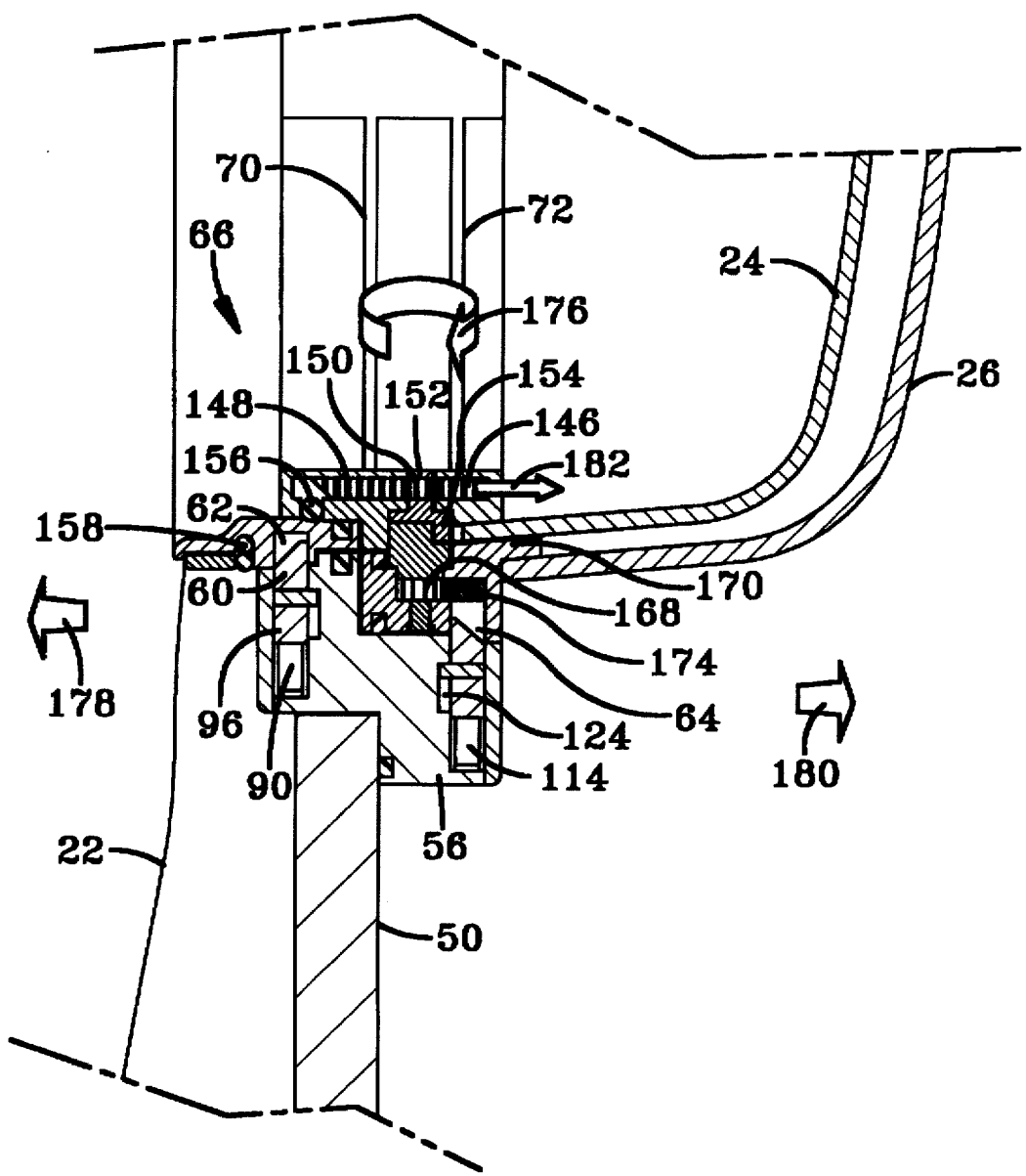

With simultaneous reference to FIGS. 7, 8(B), 8(C), 10 and 11, it is seen that a 45° clockwise rotation of the single actuator handle 80 causes the portable life support system assembly 24 to be transferred from the suit ring 48 (FIG. 10) to the containment assembly 26 (FIG. 11). More particularly, as seen in FIGS. 7, 8(B) and 8(C), the rotation of the single actuator 80 (FIG. 7) of about 45° from its initial (solid representation) corresponding to FIG. 8(B) causes the cable 110, connected to both the studs 118 and 120, to drag the second latch member 64 laterally from its position of FIG. 8(B) to its position of FIG. 8(C). As seen in FIG. 11, the lateral movement of the second latch member 64 correspondingly moves the second rack and pinion assembly 134 in a lateral manner as indicated by directional arrow 180. More particularly, as the second latch member 64 laterally moves from the position shown in FIG. 8(B) to the position shown in FIG. 8(C), its groove 130 correspondingly moves the tab 132 which, in turn, translates the gear rack 174 (see FIG. 11) which, in turn, rotates the gears 168 which, in turn, rotates the portion 170 which, in turn, rotates the grooved face portion 154 which, in turn, rotates the gears 150 as indicated in FIG. 11 by the directional arrow 176. It should be noted that FIG. 11 indicates the lateral movement (out of the paper as viewed in FIG. 11) of the first and second latch members 60 and 64 by directional arrows 178 and 180 respectively, whereas the lateral movement of rack 148 within the channel 146 is indicated by directional arrow 182. The movement of the tab 132 from its position of FIG. 8(B) to its position of FIG. 8(C) correspondingly causes the captured grooved face portion 154 and portion 170 to move from the orientation shown in FIG. 10 to their orientation shown in FIG. 11. This lateral movement of tab 132 causes a 180° rotation of gears 150, as indicated by directional arrow 176, which, in turn, causes the rack 148 to be moved in direction 182 from its location shown in FIG. 10 to its location shown in FIG. 11. As seen in FIG. 11, this lateral movement causes the rack 148 to be no longer in contact with the ball 156. Conversely, the grooved face portion 154 of the portable life support system assembly 24 is captured by the portion 170 of the containment assembly 26. Furthermore, as seen in FIG. 11, all of the assembly components that is, the suit ring 48, the portable life support system assembly 24 and the containment assembly 26 all remain captured or interconnected to the vehicle ring 56.

RELEASE MODE

Figure 12:
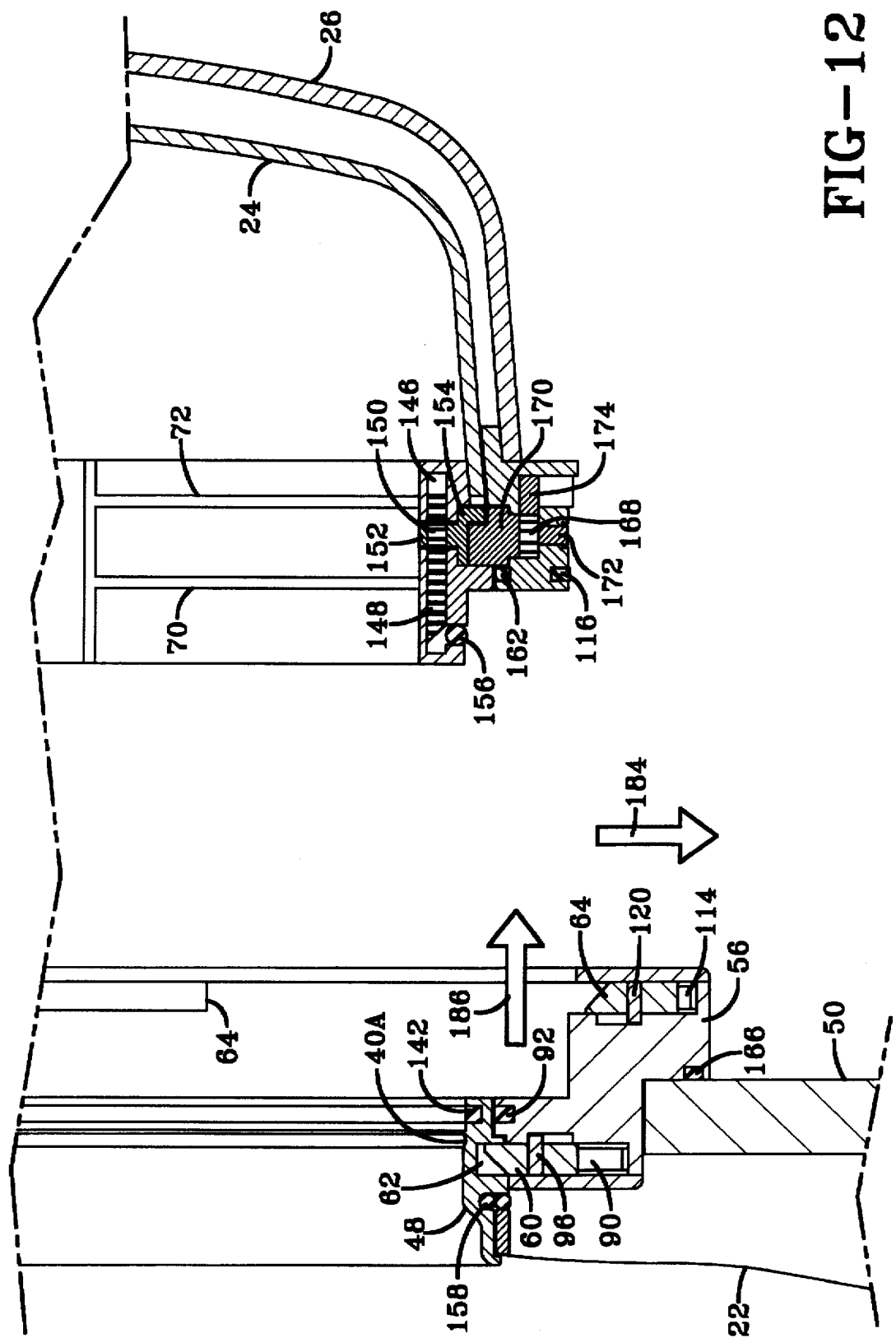

With simultaneous reference to FIGS. 6(B), 6(C), 7, 8(C), 8(D), 11 and 12, it is seen that as the single actuator 80 (FIG. 7) is rotated through its final portion, that is 22.5°, in a clockwise direction, by being activated by the spring-loaded pin 76A, it causes the first latch member 60 to translate laterally from the position shown in FIG. 6(B) to the position shown in FIG. 6(C). The lateral translation of the first latch member 60 allows the first latch member 60 to remain locked in position, that is, its vertical orientation is maintained, because the studs 94 and 96 are still within their respective grooves 98 and 100. Similarly, this same 22.5° rotation of the single actuator 80 causes the second latch member 64 to be translated laterally; however, as seen in FIGS. 8(C) and 8(D), more particularly, as seen in FIG. 8(D), the studs 118 and 120 of the second latch member 64 are no longer within their respective grooves 122 and 124, but rather are positioned within their depressions 126 and 128. Because the studs 118 and 120 were in the depressions 126 and 128 respectively when the second latch member 64 was dragged laterally by the clockwise rotation (the terminal segment of 22.50°) of the single actuator 80, the cable 110 pulled down the studs 118 and 120 which, in turn, pulled the groove 130 out of contact with the tab 132, which is shown in FIG. 12 by directional arrow 184. As seen in FIG. 12, the second latch member 64 is moved downward, thereby, allowing the containment assembly 26 (together with the captured PLSS assembly 24) to be separated from the vehicle ring 56 and in the direction indicated by arrow 186. As further seen in FIG. 12, and as already described with reference to FIG. 11, the ball 156 is no longer riding or projected into groove 40A of the suit ring 48, thereby, allowing the portable life support system assembly 24 to be separated from the suit ring 48. With these separations, the crew member can now doff the protective suit 22 and enter the vehicle by pulling him/herself backwards through the opening defined by vehicle ring 56. To don the protective suit the entire sequence that is, the docking, capture, transfer and release modes is reversed with the final action of releasing the protective suit 22 again requiring activation of the single actuator 80, in particular, the safety trigger 76A preferably contained in the single actuator 80.

As seen with reference to FIG. 6(A) and FIG. 8(D), the first latch member 60 and the second latch member 64 are directly linked through the single actuator 80 and retract at opposite ends of the actuator's 80 travel. More particularly, the first latch member 60 and second latch member 64 retract, that is, release their captured elements, that is, suit ring 48 and containment assembly 26, as respectively indicated in FIGS. 6(A) and 8(D). Because of this opposite retraction mechanism, the first and second latch members 60 and 64, respectively, cannot be accidentally retracted simultaneously, thereby, reducing the danger of any unwanted contamination because of inadvertent use of control knobs and handles. The present invention further includes a contaminant purging system for removing unwanted contamination and may be further described with reference to FIG. 13.

Figure 13:
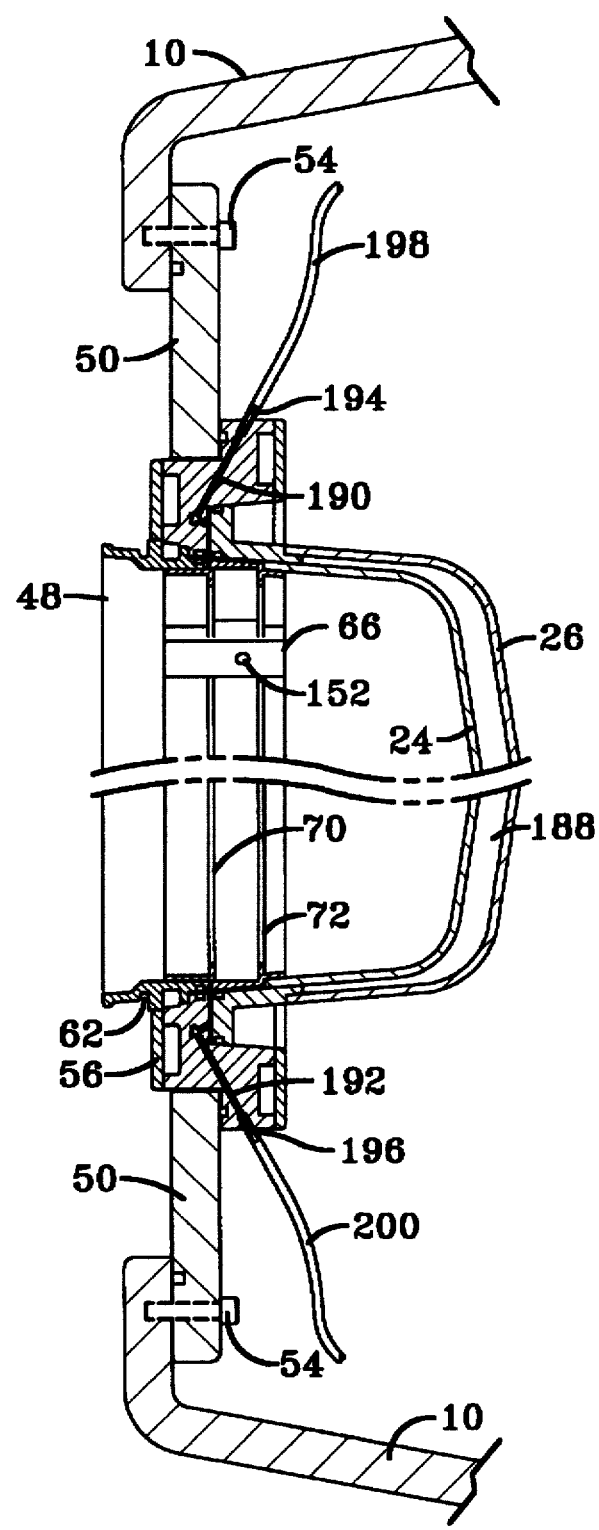
FIG. 13 illustrates the contaminant purging system related to the present invention.

FIG. 13 illustrates a system for purging interstitial volume between the region sealed by the first, second, third and fourth seals of the suitlock assembly 32 of FIG. 2 and generally indicated in FIG. 13 by reference number 188. The purging system of FIG. 13 has an inlet opening 190 located at the top (as viewed in FIG. 13) of the vehicle ring 56 and an outlet opening 192 located at the bottom (as viewed in FIG. 13) of the vehicle ring 56. Preferably, the inlet opening 190 has a one-way valve 194 and the outlet opening 192 also has a one-way valve 196. The one-way valves 194 and 196 isolate the interstitial volume 188 after purging either into a holding container or to the outside of the vehicle, such as outside the hazmat vehicle 10. The one-way valves 194 and 196 respectively are connected to conduits 198 and 200, wherein conduit 198 is connected to a purging source. Depending on the nature of the chemicals' exposure, either a vacuum, a neutralizing gas or a liquid could be used as the purging source. The outlet conduit 200 is opened into the atmosphere outside the hazmat vehicle 10 of FIG. 1 or into a holding container (not shown) for later removal.

Although the hereinbefore given description was primarily related to a crew member performing the duties involved in hazardous or toxic material clean-up, the principles of the present invention related to an environment suit and to the suitlock docking mechanism are equally applicable to the crew member performing the duties on a space vehicle or space station. The suitlock mechanism of the present invention actually exceeds the needs of those of space vehicle or space station because the present invention provides sealing against any potentially contaminated volume being opened into the vehicle and which sealing is not necessary for a zero-gravity, space environment.

It should now be appreciated that the practice of the present invention provides for an environmental suit and a suitlock docking mechanism that may be used by a crew member involved with either hazardous material clean-up or in performing his/her duties in a space vehicle or space station. The suitlock docking mechanism has a single actuator that is easily operated in a manner so as to substantially eliminate any operational failures that may otherwise be caused by multiple actuator devices.

It should be further appreciated that the present invention provides for a suitlock docking mechanism as well as protection suits that are sealed from any contaminated environment.

Further, it should be appreciated that the present invention provides for a docking mechanism having a relatively light weight such as that representative of about 60 pounds which is a critical consideration in human-carried equipment in either a hazmat or planetary exploration scenario. Further, the present invention provides improved visibility such as that enhanced by the hemispherical helmet of the present invention.

It should further be apparent to those skilled in the art that various changes in the form and details of the invention as shown and described may be provided and it is intended that such changes be included within the spirit and scope of the claims appended hereto.

What I claim is:

1. A suitlock system for egress from and ingress to a sealed environment by way of a hatch, said suitlock system comprising:

(a) a protective suit having a back with an access opening for donning and doffing said protective suit;
   (b) a ring affixed to said back of said protective suit;
   (c) a portable life support system enclosure;
   (d) a containment assembly;
   (e) a vehicle ring affixed to said hatch;
   (f) a first means for releasably attaching said ring of said suit to said vehicle hatch ring; and
   (g) a second means comprising a single actuator having linkage adjustment means for releasably and separately connecting and disconnecting said portable life support system enclosure and said containment assembly to said suit ring, and for releasably and jointly connecting and disconnecting said portable life support system enclosure and said containment assembly to said vehicle hatch ring.

2. The suitlock system according to claim 1, wherein said single actuator has means so as to be rotatable in a predetermined direction for a predetermined distance and the rotatable means includes a spring-loaded pin that allows for the rotation of said single actuator for a terminal segment of said predetermined distance.

3. The suitlock system according to claim 1, wherein said suit and hatch rings each has a generally elliptical concentric shape and is comprised of aluminum.

4. The suitlock system according to claim 2, wherein said vehicle hatch ring has an interior and exterior surface and said suit ring has a tapered outer surface having a cutout therein, and said first means comprises:

(a) at least one first latch member located on said exterior surface and having a tapered face that comes into contact with said tapered outer surface of said suit ring as said suit ring is brought together with the exterior surface of said hatch ring, and
   (b) yielding means having means for being joined to said at least one first latch member, said yielding means allowing said first latch member to yield as said tapered outer surface of said suit ring comes into contact therewith until said first latch member comes into contact with said cutout of said tapered outer surface of said suit ring, whereby said at least one latch member finds its way into said cutout of said tapered outer surface of said suit ring.

5. The suitlock system according to claim 4, wherein said yielding means comprises a leaf spring which is arranged so as to be depressed radially as said at least one first latch member comes into contact with said tapered outer surface of said suit ring.

6. The suitlock system according to claim 4, wherein said tapered outer surface of said suit ring further includes a groove located adjacent said cutout of said tapered outer surface of said suit ring and said second means comprises:

(a) said at least one first latch member having first and second studs with first and second ends and with the first end of each which fits into and is guided within grooves in said exterior surface of said hatch ring, said grooves in said exterior surface each having a depression at one end thereof;
   (b) at least one second latch member located on said interior surface of said hatch ring and in alignment with said at least one first latch and having a notch in one of its surfaces, said at least one second latch member having first and second studs with first and second ends and the first end of each which fits into and is guided with grooves in said interior surface of said hatch ring, said grooves in said interior surface each having a depression at one end thereof which grooves and depressions are in alignment with said depressions and said grooves of said exterior surface;
   (c) at least one first rack and pinion assembly positioned non-collinear with respect to said at least one first latch member and located on said portable life support system enclosure with the rack thereof being positioned in an offset manner within a channel of said portable life support system enclosure, said offset rack having gears and with one end thereof positioned near a ball located in a cutout positionable in alignment with said groove of said tapered outer surface of said suit ring, said first rack and pinion assembly having a first shaft with first and second ends with the first end having teeth that mesh with gears of said offset rack and the second end having a grooved face portion;
   (d) at least one second rack and pinion assembly positioned non-collinear with respect to said at least one second latch member and located on said containment assembly with a second shaft having first and second ends and with the second end being dimensioned to mate with said grooved face portion of the first shaft, said second shaft having its first end comprising teeth that mesh with gears of the second rack, said second rack and pinion assembly having a tab that is releasably positionable in said notch of said at least one second latch member; and
   (e) a cable assembly comprising:
      (i) a shaft carrying two spindles that are respectively located at the interior and exterior surfaces of said vehicle ring;
      (ii) a plurality of cable guides located about the circumference of each of said interior and exterior surfaces of said vehicle ring;

(iii) a first continuous cable intertwined about the spindle and cable guides of said exterior surface of said vehicle ring and having means for being connected to said second ends of each of said first and second studs of said at least one first latch member;
(iv) a second continuous cable intertwined about the spindle and cable guides of said exterior surface of said vehicle ring and having means for being connecting to said second ends of each of said first and second studs of said at least one second latch member; and
(v) means for connecting said shaft of said cable assembly to said single actuator, to said spring-loaded pin, and to said means for allowing rotation of said single actuator in a predetermined direction and for a predetermined distance.

7. The suitlock system according to claim 6, wherein said first rack and pinion assembly and said at least one first latch member are positioned substantially perpendicular to each other and said second rack and pinion assembly and said at least one second latch member are also positioned substantially perpendicular to each other.

8. The suitlock system according to claim 6, wherein said at least one first latch member, said at least one second latch member, said at least one first rack and pinion assembly, and said at least one second rack and pinion assembly are each of a total number of seven (7), said at least one first and second latch members being spaced apart from each other about respective exterior and interior surfaces of said vehicle ring and said first and second rack and pinion assemblies also being spaced apart from each other and in respective alignment with said at least one first and second latch members.

9. The suitlock system according to claim 1, wherein said suit ring has a surface comprising a fiberglass material and has means for fastening a circular helmet ring thereto and to which circular helmet ring is attached a helmet by fastening means.

10. The suitlock system according to claim 9, wherein said helmet has a hemispherical shape and is comprised of a transparent material.

11. The suitlock system according to claim 9, wherein said protective suit is attached to both said circular ring and said suit ring by removable band clamps.

12. The suitlock system according to claim 6 further comprising;
(a) a first seal positioned between mating surfaces of said portable life support system enclosure and said containment assembly;
(b) a second seal positioned between mating surfaces of said portable life support system enclosure and said suit ring;
(c) a third seal positioned between mating surfaces of said suit ring and said vehicle ring; and
(d) a fourth seal positioned between mating surfaces of said containment assembly and said vehicle ring.

13. The suitlock system according to claim 12 further comprising a system for purging the interstitial volume between the regions sealed by said first, second, third and fourth seals, said purging system comprising:
(a) inlet and outlet openings in said hatch ring;
(b) a one-way valve in each of said inlet and outlet openings;
(c) conduits having means for being connected to said inlet and outlet openings; and
(d) means having first and second ends with the first end having means for being connected to the conduit at said outlet end and with the second end having means for being connected to a source comprised of one of fluid gas and vacuum for purging said interstitial volume.

* * * * *